March 5, 1957
L. SILVER
2,784,055
PROCESS FOR THE TREATMENT OF GASES
RICH IN HYDROGEN SULPHIDE
Filed April 28, 1952
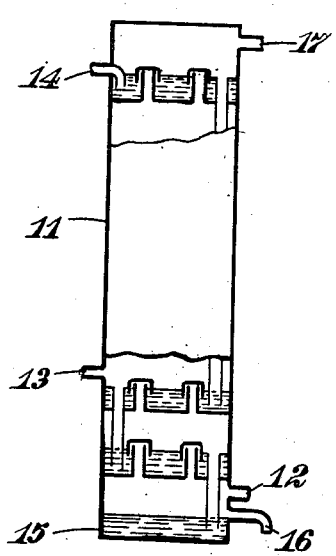
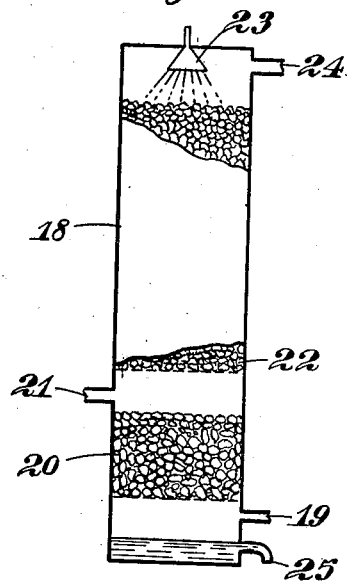
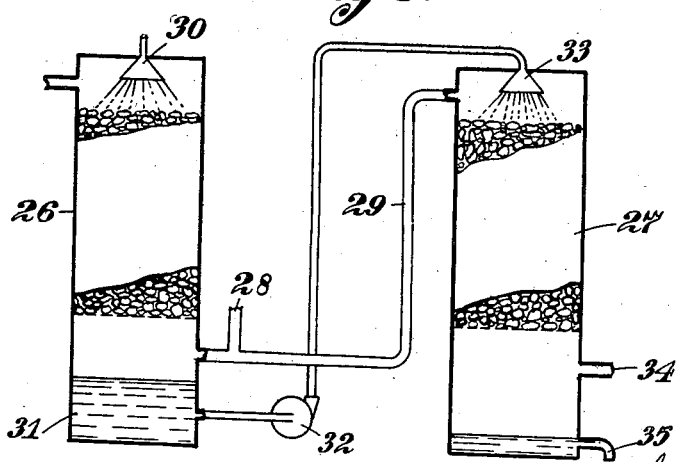
Inventor:
Leonard Silver
by Hoopes, Leonard & Glenn
Attorneys

United States Patent Office 2,784,055
Patented Mar. 5, 1957

2,784,055

PROCESS FOR THE TREATMENT OF GASES RICH IN HYDROGEN SULPHIDE

Leonard Silver, London, England, assignor to North Thames Gas Board, London, England, a British corporation Application April 28, 1952, Serial No. 284,764

Claims priority, application Great Britain May 4, 1951

8 Claims. (Cl. 23—181)

This invention is for improvements in or relating to a process for the treatment of gases rich in hydrogen sulphide and has particular reference to a process and apparatus for the removal of ammonia from gases rich in hydrogen sulphide and in particular from gases also containing carbon dioxide. Such gases are obtained from the liquors employed in the scrubbing of gases obtained by the distillation of carbonaceous materials by the Koppers process i. e. by the washing of gases with an aqueous solution of sodium carbonate.

The gases obtained from the wash liquors of the Koppers liquid purification plant by treatment with steam consist of hydrogen sulphide, carbon dioxide and hydrogen cyanide. The presence of hydrogen cyanide is undesirable if the gas is to be burnt in Claus kilns or in a contact plant for the production of sulphur or sulphuric acid.

Processes are known whereby the hydrogen cyanide may be removed from the gas and sold as sodium cyanide solution or as anhydrous hydrocyanic acid.

In United States specifications Serial Nos. 248,994, now Patent No. 2,743,153, and 248,995 an alternative process for dealing with the hydrogen cyanide consists in reacting the gaseous mixture with water vapour at an elevated temperature not exceeding 500° C. in the presence of a contact catalyst to convert the nitrogen content of the hydrogen cyanide to ammonia. The resulting gases contain in addition to hydrogen sulphide, carbon dioxide, carbon monoxide and ammonia.

It is an object of the present invention to remove the ammonia from the gases before passage of the hydrogen sulphide to a Claus kiln or contact acid plant.

It is aldready known that washing with sulphuric acid will remove the ammonia without absorbing more than a negligible proportion of hydrogen sulphide but this method requires special acid resisting equipment. Washing with water avoids the need for expensive equipment but even when a bubble-cap column is employed, over one equivalent of hydrogen sulphide is absorbed with the ammonia.

I have now found that it is possible to secure the advantages of water washing without encountering the loss of hydrogen sulphide referred to above by employing a two-stage process in the second stage of which air or other inert gas is passed through the aqueous washing liquor for the displacement of dissolved hydrogen sulphide.

According to the present invention there is provided a two-stage process for removing ammonia from gases containing hydrogen sulphide and ammonia with or without carbon dioxide, which process comprises in the first stage washing the gas with water and in the second stage passing air or other inert gas through the aqueous wash liquor from the first stage the air or other inert gas then joining the gas entering the first stage.

It is known that reaction in solution between carbon dioxide and ammonia takes place rather slowly and in carrying out the process of the present invention in those cases in which carbon dioxide is present it is advisable to employ an apparatus in which aqueous liquid is retained for such a time as to enable this process to proceed to substantial completion.

It has been found that a bubble-cap column having comparatively deep trays is well adapted for carrying out the present invention, the gas to be treated being introduced into the column below two or more plates in which the first stage of the washing takes place but above one or more plates in which the treatment with air or other inert gas takes place.

Instead of employing a bubble-cap column it is possible to employ a packed column containing two sections of packing in which the gas is introduced below the upper section of packing and the air or inert gas is introduced below the lower section of packing, or a pair of packed columns may be employed the first of which is used for the absorption of the ammonia and the second for the treatment with air or other inert gas which then mixes with the gas entering the first column.

As another alternative the process may be carried out in a horizontal multi-stage washer of known type.

The washing operation is normally carried out at air temperature and the gas coming from the hydrogen cyanide hydrolysis plant at a temperature of 250° to 500° C. e. g. 320° C. is therefore cooled to a temperature between 15° and 24° C.

Since the gas leaving the present process is to be burnt in a Claus kiln or employed in a contact acid plant oxygen is ultimately to be added to it and the addition of air for example up to 50% of its volume is therefore not disadvantageous. Other gases which are inert for the purpose of the present invention may be employed if available though they possess no advantage over air.

After being employed in the present invention the aqueous ammoniacal liquor may be added to the ammoniacal liquor of the coal gas purification system.

Following is a description by way of example of one method of carrying the invention into effect.

Example

The gaseous mixture from a hydrogen cyanide hydrolysis plant containing by volume 71% hydrogen sulphide, 14% carbon dioxide, 7.5% carbon monoxide and 7.5% ammonia was cooled from 400 C. to 24° C. by means of an atmospheric cooler and then passed into a bubble-cap column at a rate of 4400 cu. ft. per hour measured at 15° C. and 30″ mercury pressure where it was washed in countercurrent flow with from 40 to 50 gallons of water per hour at 15° C. The bubble-cap column consisted of a column 18″ in diameter having 10 plates the gas inlet being between the second and third plate from the bottom of the column. Each plate had a 1″ seal and at least a 6″ depth of liquid. The washing operation reduced the ammonia content of the gas passing through the column by 99%.

Air at a rate of 2000 cu. ft. per hour was passed into the base of the column in order to strip hydrogen sulphide from the liquor passing over the two plates below the gas inlet the air then joining the main gaseous mixture passing upwards through the eight plates. By this means the hydrogen sulphide removed in the wash liquor was reduced to less than 2% of the total in the gas. Without the two stripping plates about 8 to 10% of the hydrogen sulphide would be removed in the wash liquor.

The liquid from the bottom of the column was added to the ammoniacal liquor of the coal gas purification system. The hydrogen sulphide/air mixture was burnt in a Claus kiln or passed direct to a sulphuric acid contact plant.

In the accompanying diagrammatic drawings Figure 1 shows apparatus of the type employed in the foregoing example.

In that figure 11 is a bubble-cap column, with air inlet at 12 and inlet for the gas as to be treated at 13. The water for the countercurrent wash is admitted through the inlet 14 and waste liquor 15 collects at the bottom of the tower and runs off via the outlet 16. The treated gas leaves the column by outlet 17.

Figure 2 of the drawing shows an alternative form of apparatus which may be employed for the process of the present invention. In Figure 2, 18 is a packed column having inlet 19 through which air enters the column and after passing through the packing 20 joins the gas to be washed which enters through inlet 21. The mixed gases pass through the packing 22 where they are washed with water from the distributor 23. The treated gas leaves at outlet 24 and waste liquor leaves via the overflow 25.

Figure 3 of the drawing shows a further alternative form of apparatus, in which 26 and 27 are two packed columns arranged in series. The gas to be treated enters column 26 via inlet 28 where it joins with air leaving column 27 via outlet 29 and is subjected to a wash with water entering through distributor 30. The wash liquor 31 collects at the bottom of the column 26 and is pumped by pump 32 to the distributor 33 at the top of column 27. Air enters at the bottom of column 27 at the inlet 34 and leaves via outlet 29 to join the untreated gas entering column 26. The waste liquor 34 overflows at outlet 35.

I claim:

1. A multiple stage process for removing ammonia from gases containing hydrogen sulphide, ammonia and carbon dioxide comprising the steps of washing the gases with water, retaining the aqueous liquor resulting from the washing step until substantial combination of carbon dioxide and ammonia has taken place and thereafter passing an inert carrier gas through the aqueous wash liquor whereby to remove the hydrogen sulphide with the carrier gas.

2. A multiple stage process for removing ammonia from gases containing hydrogen sulphide, ammonia and carbon dioxide comprising the steps of washing the gases with water, retaining the resulting wash liquor until substantial combination of carbon dioxide and ammonia has occurred and thereafter passing an inert carrier gas through the aqueous wash liquor whereby to remove the hydrogen sulphide with the carrier gas.

3. A process as claimed in claim 1 wherein the process is carried out in a bubble-cap column, the gas to be treated being introduced into the column at a point at least below two plates in which the first stage of the washing takes place above at least one plate in which the treatment with inert carrier gas takes place.

4. A process as claimed in claim 1 which process is carried out in a column containing two packed sections, the gas to be treated being introduced below the upper section of packing and their inert carrier gas being introduced below the lower section of packing.

5. A process as claimed in claim 1 which process is carried out in a pair of packed columns in series, the first of which is used for the absorption of gases in water and the second for the treatment with insert carrier gas.

6. A multiple stage process for removing ammonia from gases containing hydrogen sulphide, ammonia and carbon dioxide which process comprises the steps of washing the gases with water at ordinary temperatures, retaining the aqueous liquor resulting from the washing until substantial combination of the carbon dioxide and ammonia has occurred and thereafter passing air through the wash liquor whereby the hydrogen sulphide is removed from the aqueous wash liquor by the air.

7. A multiple stage process for removing ammonia from gases containing hydrogen sulphide, ammonia and carbon dioxide comprising the steps of washing the gases with water, holding the resulting aqueous liquor until substantial combination of the carbon dioxide and ammonia has occurred and thereafter passing an inert carrier gas in an amount up to about 50% by volume of the treated gas through the aqueous wash liquor and thereafter combining the inert carrier gas with the gases entering the washing step.

8. A multiple stage process for removing ammonia from gases containing hydrogen sulphide, ammonia and carbon dioxide comprising the steps of washing the gases with water, holding the resulting aqueous liquor until substantial combination of the carbon dioxide and ammonia has occurred and thereafter passing air in an amount up to about 50% by volume of the treated gas through the aqueous wash liquor and thereafter combining the air with the gases entering the washing step.

References Cited in the file of this patent

UNITED STATES PATENTS

| | | |
|---|---|---|
| 1,080,938 | Still | Dec. 9, 1913 |
| 1,132,594 | Lloyd | Mar. 23, 1915 |
| 1,258,321 | Cruser | Mar. 5, 1918 |
| 1,319,663 | Davis | Oct. 21, 1919 |
| 1,375,485 | Becker | Apr. 19, 1921 |
| 1,459,703 | Wiederhold | June 19, 1923 |
| 1,824,424 | Buss | Sept. 22, 1931 |
| 1,999,546 | Pyzel | Apr. 30, 1935 |
| 2,018,863 | Miller | Oct. 29, 1935 |
| 2,081,960 | Sperr | June 1, 1937 |
| 2,245,130 | Guillessen | June 10, 1941 |
| 2,424,614 | Haun | July 29, 1947 |
| 2,500,291 | Libel | Mar. 4, 1950 |

FOREIGN PATENTS

| | | |
|---|---|---|
| 469,840 | Germany | Dec. 29, 1928 |
| 263,830 | Great Britain | Nov. 10, 1927 |